United States Patent [19]

Iwatani et al.

[11] Patent Number: 6,075,348
[45] Date of Patent: Jun. 13, 2000

[54] CONTROLLER FOR CAR GENERATOR

[75] Inventors: Shiro Iwatani; Keiichi Komurasaki, both of Tokyo-to, Japan

[73] Assignee: Mitsubishi Denki Kabushiki Kaisha, Tokyo, Japan

[21] Appl. No.: 08/932,237

[22] Filed: Sep. 17, 1997

[30] Foreign Application Priority Data

Jan. 31, 1997 [JP] Japan ................................ 9-018818

[51] Int. Cl.[7] ....................................................... H02P 9/44
[52] U.S. Cl. ................................................. 322/32; 322/28
[58] Field of Search .............................. 322/28, 29, 32, 322/58

[56] References Cited

U.S. PATENT DOCUMENTS 5,059,886  10/1991  Nishimura et al. ...................... 322/28
5,061,889  10/1991  Iwatani et al. ........................... 322/28
5,510,695   4/1996  Tanaka et al. ........................... 322/25
5,694,311  12/1997  Umeda et al. ........................... 363/89
5,714,871   2/1998  Endou ...................................... 322/28

FOREIGN PATENT DOCUMENTS 2-32857  7/1990  Japan .

Primary Examiner—Nicholas Ponomarenko
Attorney, Agent, or Firm—Sughrue, Mion, Zinn, Macpeak & Seas, PLLC

[57] ABSTRACT

Only when it is detected by a frequency/voltage converter that the frequency of the phase output of an AC generator is higher than a predetermined frequency, a smoothing capacitor is charged. Therefore, the charging of the smoothing capacitor is prevented at the time of a generation stop.

6 Claims, 4 Drawing Sheets

CONTROLLER FOR CAR GENERATOR

BACKGROUND OF THE INVENTION

1. Field of the Invention

This invention relates to a controller for controlling a generator mounted on a vehicle such as an automobile.

2. Description of the Prior Art

FIG. 6 is a circuit diagram of a controller for a car generator of the prior art. In FIG. 6, reference numeral 1 denotes an AC generator having an armature coil 101 and a field coil 102. Reference numeral 2 denotes a full-wave rectifier having rectifying diodes 203 to 208 for rectifying the output of the AC generator 1, 201 a positive-side output terminal of the full-wave rectifier 2 and 202 is a negative-side output terminal of the full-wave rectifier 2. Numeral 3 designates a voltage regulator for regulating the output voltage of the AC generator 1 to a predetermined value and having a power transistor 301 for controlling a field current running through the field coil 102 of the AC generator 1 intermittently. Numeral 7 represents a storage battery charged by the rectified output of the AC generator 1, 5 a charge lamp for indicating whether the storage battery 7 is charged or not, 6 a key switch connected to the charge lamp 5 and the storage battery 7, and 4 a charge lamp controller for controlling the charge lamp 5. The charge lamp controller 4 comprises a smoothing capacitor 403 for smoothing the single-phase output of the AC generator 1, a charging resistor 401 for applying a charging current to the smoothing capacitor 403, a discharging resistor 402 for applying a discharging current from the smoothing capacitor 403, voltage dividing resistors 404 and 405 for setting a predetermined value for a single-phase output voltage, a comparator 406 for comparing the predetermined value set by the voltage dividing resistors 404 and 405 with the smoothing voltage of the single-phase output voltage, a power transistor 408 for driving the charge lamp 5 according to the output of the comparator 406, and a base resistor 407 for the power transistor 408.

A description is given of the operation of the controller. When the key switch 6 is turned on and an unshown internal combustion engine is started, the AC generator 1 runs, and the AC power output of the armature coil 101 is provided to the full-wave rectifier 2, and the rectified signal applied to the storage battery 7 as a DC current. The single-phase output voltage of the AC generator 1 is smoothed by the smoothing capacitor 403 and provided to the reverse input terminal of the comparator 406. Thereby, the comparator 406 compares a predetermined value given to the non-reverse input terminal thereof with the single-phase output voltage given to the reverse input terminal thereof. When the single-phase output voltage is larger than the predetermined value, comparison output is changed from a high level to a low level, the power transistor 408 is turned off, and the charge lamp 5 is turned off and the storage battery 7 is charged.

In the above controller of the prior art, since the charging of the storage battery 7 is indicated by detecting the level of the single-phase voltage of the charging generator 1 by means of the smoothing capacitor 403, when a leak of a reverse voltage occurs in one of the diodes on a positive side, for example, the diode 205 of the full-wave rectifier 2, a current from the positive electrode of the storage battery 7 passes through the diode 205 and flows into the smoothing capacitor 403 in spite of the fact that no power is generated as the internal combustion engine stops and the AC generator 1 stops running. As a result, the smoothing capacitor 403 is charged and the voltage of the storage battery 7 becomes a single-phase voltage which is provided to the reverse input terminal of the comparator 406 to turn off the charge lamp 5. In other words, though the AC generator 1 stops power generation and the single-phase voltage is 0 V, there occurs an erroneous operation that the charging of the storage battery 7 is indicated.

SUMMARY OF THE INVENTION

It is therefore an object of this invention which has been made to solve the above problem to provide a controller for a car generator which prevent the erroneous indication by the charge lamp of the charging of the storage battery due to a leak in a positive-side diode of the full-wave rectifier.

According to a first aspect of the present invention, there is provided a controller for a car generator wherein only when it is detected that the frequency of the single-phase output of the AC generator 1 is higher than a predetermined frequency, the smoothing capacitor 403 for smoothing the single-phase output is charged.

According to a second aspect of the present invention, there is provided a controller for a car generator wherein only when it is detected by frequency detection means that the frequency of the single-phase output of the AC generator 1 is higher than the predetermined frequency, the smoothing capacitor 403 is charged.

According to a third aspect of the present invention, there is provided a controller for a car generator wherein the frequency detection means is a frequency/voltage converter 411.

The above and other objectives, features and advantages of the invention will become more apparent from the following description when taken in conjunction with the accompanying drawings.

DETAILED DESCRIPTION OF THE PREFERRED EMBODIMENTS

Figure 1:
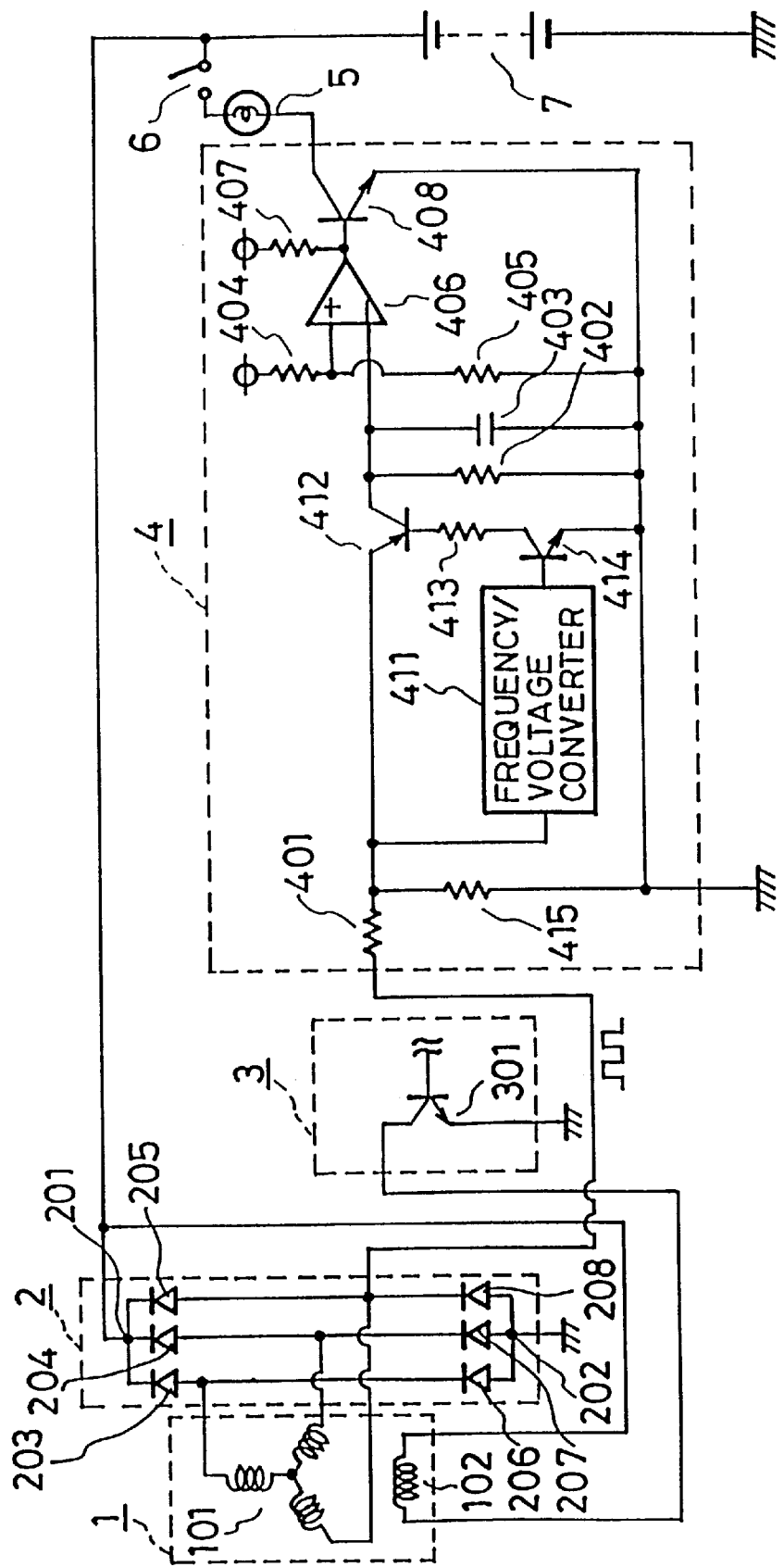
FIG. 1 is a circuit diagram of a controller for a car generator according to an embodiment of the present invention.
Figure 6:
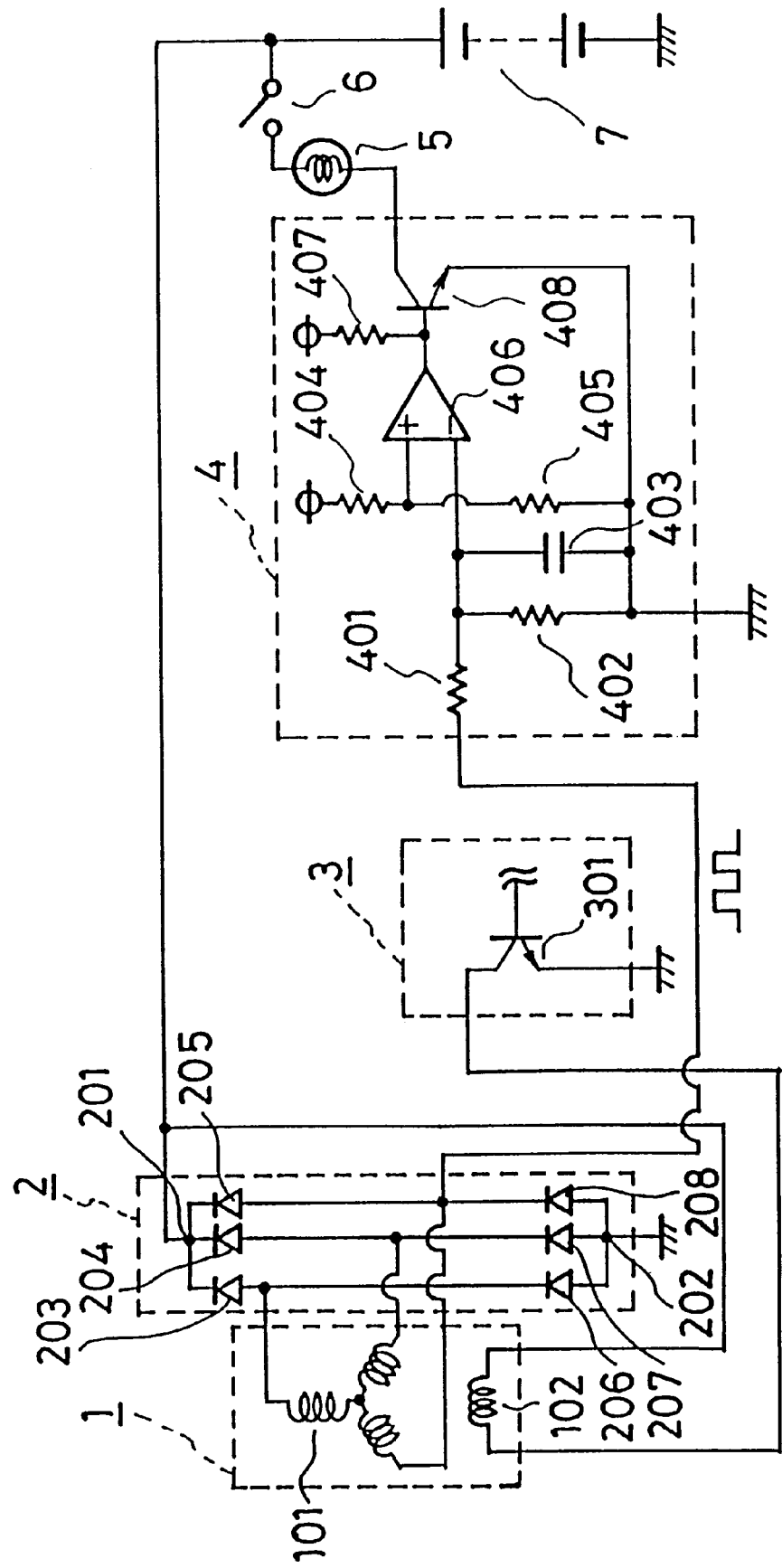
FIG. 6 is a circuit diagram of a controller for a car generator of the prior art.

FIG. 1 is a circuit diagram of a controller for a car generator according to a preferred embodiment of the present invention. In FIG. 1, the same or corresponding elements are given the same reference numerals as those of FIG. 6 and their descriptions are omitted. In FIG. 1, reference numeral 411 denotes a frequency/voltage converter (F/V converter) as frequency detection means for charging the smoothing capacitor 403 only when it detects that the frequency of the single-phase output of the AC generator 1 is higher than a predetermined frequency, 414 a transistor whose base is connected to the output of the frequency/ voltage converter 411, collector is connected to one end of a resistor 413 and emitter is connected to the ground, 412 a transistor whose emitter is connected to one end of the resistor 401, base to the other end of the resistor 413 and collector to the reverse input terminal of the comparator 406, and 415 is a dividing resistor whose one end is connected to one end of the resistor 401 and the other end to the ground.

Figure 2:
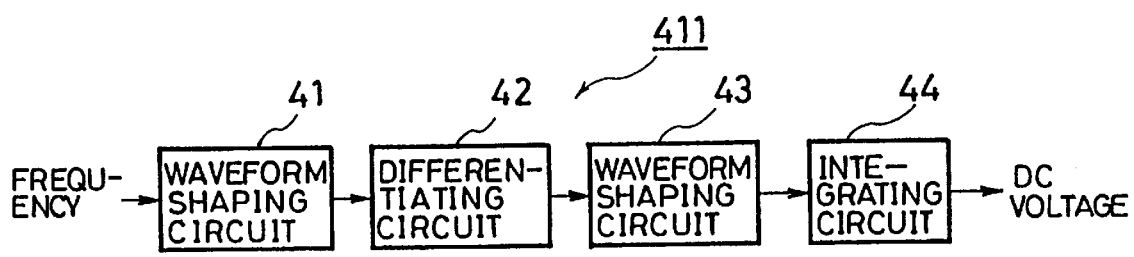
FIG. 2 is a block diagram of a frequency/voltage converter of FIG. 1.
Figure 3:
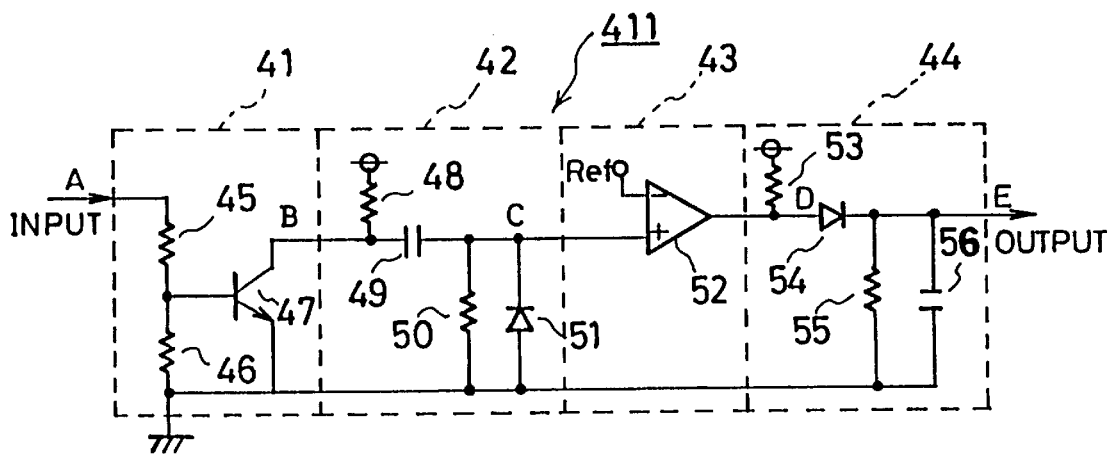
FIG. 3 is a circuit diagram of the frequency/voltage converter.

FIG. 2 is a block diagram of the frequency/voltage converter 411. FIG. 3 is a circuit diagram of the frequency/voltage converter 411. This frequency/voltage converter 411 comprises a waveform shaping circuit 41 provided with resistors 45 and 46 and a transistor 47, a differentiating circuit 42 provided with resistors 48 and 50, a capacitor 49 and a diode 51, a waveform shaping circuit 43 provided with a comparator 52, and an integrating circuit 44 provided with resistors 53 and 55, a diode 54 and a capacitor 56.

Figure 4:
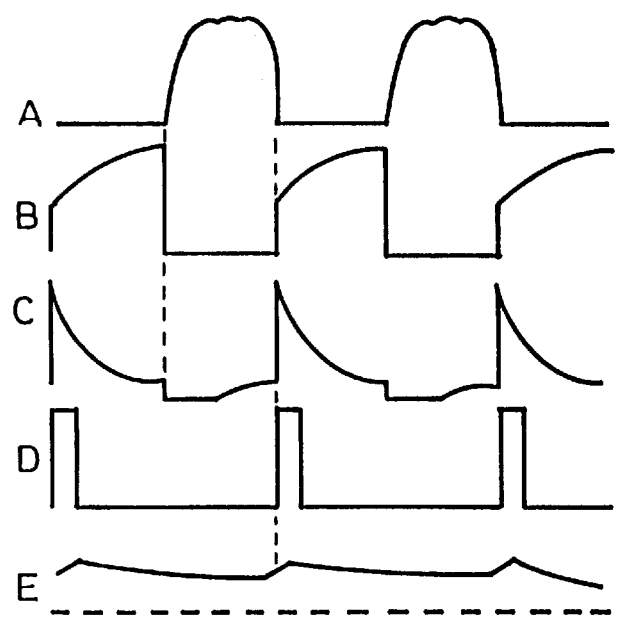
FIG. 4 is a signal waveform diagram for explaining the operation of the frequency/voltage converter.
Figure 5:
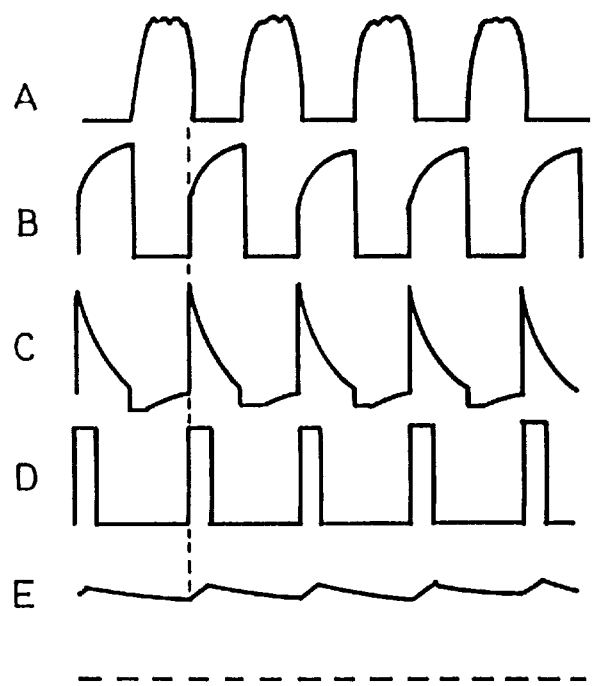
FIG. 5 is a signal waveform diagram when the frequency of the signal of the above signal waveform diagram is doubled.

In the above frequency/voltage converter 411, when a signal A as shown in FIG. 4 is applied to the waveform shaping circuit 41, it is shaped into a signal B which is then applied to the differentiating circuit 42 to become a signal C having a predetermined time constant. This signal C is applied to the non-reverse input terminal of the comparator 52 of the waveform shaping circuit 43 to be compared with a reference voltage Ref and become a pulse signal D having a predetermined width. This pulse signal D is a pulse signal having a predetermined width and a frequency proportional to the frequency of the input signal A. Thereafter, the pulse signal D is integrated by the integrating circuit 44 to obtain a voltage signal E having a frequency proportional to the frequency of the input signal A. When a signal having a double frequency as that of the signal A shown in FIG. 4 is applied to the frequency/voltage converter 411, the signals A, B, C, E and F become such as shown in FIG. 5.

A description is given of the operation of this embodiment of the present invention with reference to FIG. 1. When the key switch 6 is turned on and the unshown internal combustion engine is started, the AC generator 1 runs, and the AC power output of the armature coil 101 is provided to the full-wave rectifier 2, and the rectified signal is applied to the storage battery 7 as a DC current. The single-phase output voltage of the AC generator 1 is provided to the frequency/voltage converter 411. Although the frequency/voltage converter 411 converts the frequency of the single-phase output of the Ac generator 1 into a voltage, it does not turn on the transistor 414 when the detected frequency is lower than a predetermined value. When the AC generator 1 reaches a normal number of revolutions and generates enough power to charge the storage battery 7 properly, the frequency/voltage converter 411 detects that the frequency at that point is higher than the predetermined value and turns on the transistor 414, whereby the transistor 412 is also turned on. Therefore, the smoothing capacitor 403 is charged and the potential of the reverse input terminal of the comparator 406 becomes higher than the potential of the non-reverse input terminal thereof, the output of the comparator 406 is changed from a high level to a low level, the transistor 408 is turned off, and the charge lamp 5 is turned off to indicate that the storage battery 7 is being charged. In this embodiment, the single-phase output of the generator is detected. The present invention is not limited to this and a multi-phase output may be detected to increase detection accuracy.

As described above, unlike the controller of the prior art in which only the voltage level of the single-phase output is detected and the charge lamp is controlled to be turned on and off, according to this embodiment, a low/high level repeating signal corresponding to the number of revolutions of the generator obtained only when it operates properly, that is, the frequency of the single-phase output is detected and the voltage level of the single-phase output can be detected only when the number of revolutions of the generator reaches a predetermined value. Therefore, the smoothing capacitor is not charged when the power is not generated when a leak occurs in a positive-side diode of the full-wave rectifier, for example, and the erroneous detection control of the charge lamp is avoided.

As described above, according to the first aspect of the present invention, since the smoothing capacitor for smoothing the phase output is charged only when it is detected that the frequency of the phase output of the AC generator is higher than a predetermined frequency, the smoothing capacitor is not charged at the time of a generation stop when a leak occurs in a positive-side diode of the full-wave rectifier. Thus, the erroneous detection control of the charge lamp of the storage battery can be prevented and the reliability of the apparatus is improved.

According to the second aspect of the present invention, since the smoothing capacitor is charged only when it is detected by the frequency detection means that the frequency of the phase output of the AC generator is higher than the predetermined frequency, the frequency detection meas does not detect the frequency of the phase output at the time of a generation stop when a leak occurs in a positive-side diode of the full-wave rectifier, and the smoothing capacitor is not charged. Therefore, the erroneous detection control of the charge lamp of the storage battery can be prevented and the reliability of the apparatus is improved.

According to the third aspect of the present invention, since the frequency detection means is formed of a frequency/voltage converter, the frequency of the phase output of the AC generator can be converted into a voltage and the smoothing capacitor can be charged. Therefore, the effects of the first and second aspects of the present invention can be obtained.

What is claimed is:

1. A controller for a generator, comprising :

an AC generator;

a frequency/voltage converter which detects when a frequency of a signal output from said AC generator is higher than a predetermined frequency, and which outputs a voltage correlating to the frequency of said signal; and a capacitor coupled to said frequency/voltage converter;

wherein when the frequency of said signal output from said AC generator is higher than said predetermined frequency, said capacitor is charged.

2. A controller for a generator, comprising:

an AC generator;

a controller which detects a frequency of a signal output by said AC generator;

a capacitor for smoothing the phase output of said signal output from said AC generator;

a battery; and a comparator which compares a voltage of said smoothing capacitor with a predetermined voltage;

wherein when the frequency of said signal output from said AC generator is higher than a predetermined frequency, said capacitor is charged; and wherein said battery is being charged when said voltage of said capacitor is greater than said predetermined voltage.

3. The controller according to claim 2, wherein said controller comprises a frequency/voltage converter for outputting a voltage correlating to the frequency of said signal output by said AC generator.

4. A controller for a generator, comprising:

an AC generator;

a charge lamp controller which detects a frequency of a signal output by said AC generator;

a charge lamp connected to said charge lamp controller; and a battery coupled to said AC generator;

wherein when said charge lamp controller detects that the frequency of said signal output from said AC generator is higher than a predetermined frequency, said charge lamp is turned off to indicate that said battery is being charged.

5. The controller according to claim 4, wherein said charge lamp controller comprises:

a frequency/voltage converter for converting the frequency of said signal from said AC generator to a voltage; and a capacitor which is charged when the frequency of said signal from said AC generator is larger than said predetermined frequency.

6. The controller according to claim 5, further comprising:

a comparator for comparing a voltage of said capacitor to a predetermined voltage, wherein said charge lamp is turned off when said voltage is greater than said predetermined voltage.

* * * * *